UNITED STATES PATENT OFFICE.

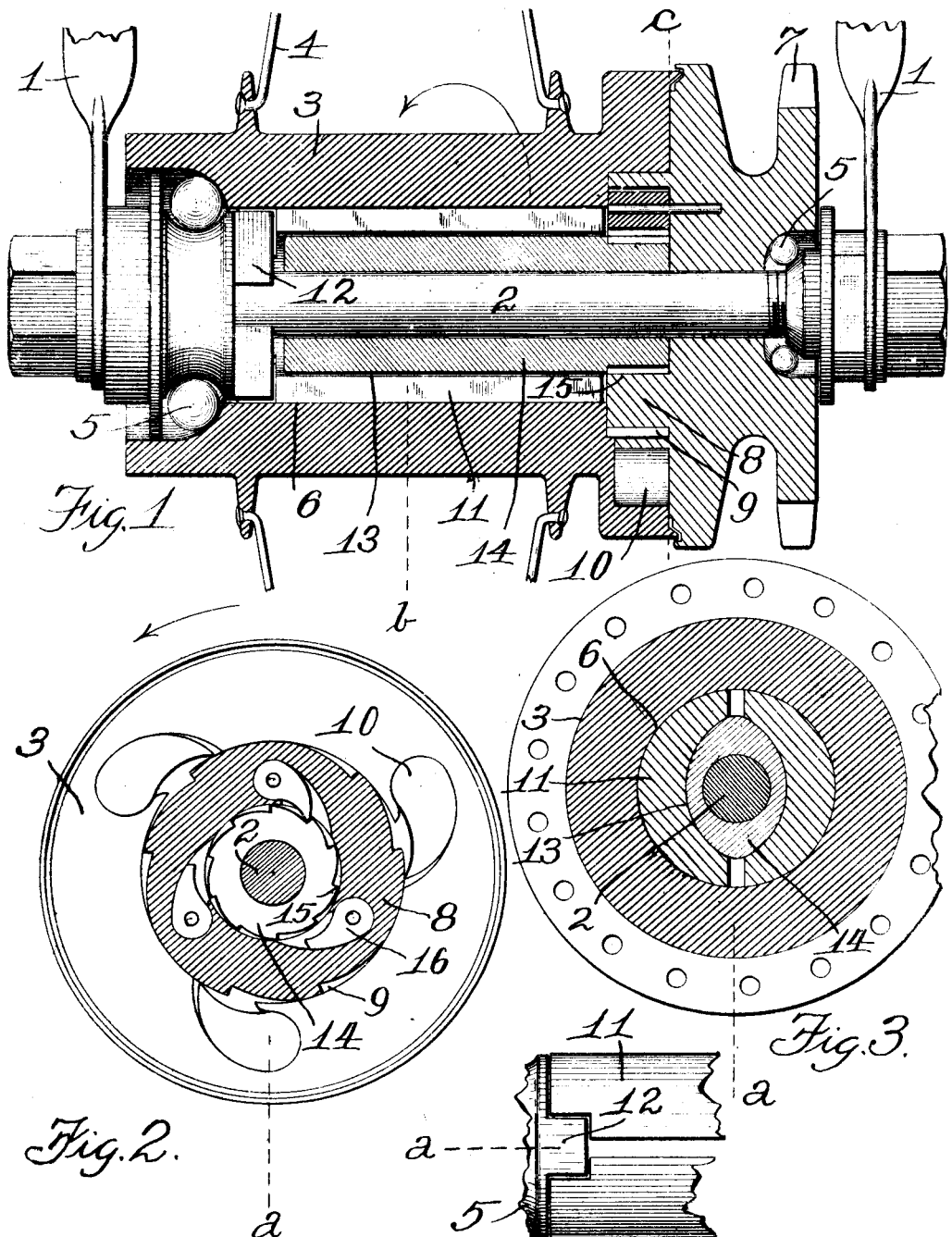

OWEN C. WATKINS, OF MIDDLETOWN, OHIO, ASSIGNOR OF ONE-THIRD TO THOMAS E. REED, OF MIDDLETOWN, OHIO.

COASTER-BRAKE.

1,139,090.  Specification of Letters Patent.  Patented May 11, 1915.

Application filed August 24, 1914. Serial No. 858,187.

*To all whom it may concern:*

Be it known that I, OWEN C. WATKINS, a citizen of the United States, residing at Middletown, Butler county, Ohio, have invented certain new and useful Improvements in Coaster-Brakes, of which the following is a specification.

This invention, pertaining to improvements in coaster brakes for bicycles and relating to features for simplifying such brakes and for increasing their durability, will be readily understood from the following description taken in connection with the accompanying drawing in which:—

Figure 1 is a vertical longitudinal section of my improved brake, the section being taken in the plane of line $a$ of the other figures; Fig. 2 is a vertical transverse section in the plane of line $c$ of Fig. 1; Fig. 3 is a vertical transverse section in the plane of line $b$ of Fig. 1; and Fig. 4 is a plan at one end of the brake-sleeve.

In the drawing:—1, indicates the usual rear fork-members; 2, the axle secured therein as usual; 3, the hub surrounding the axle; 4, the spokes; 5, ball bearings; 6, the cylindrical bore of the hub, concentric with the axle; 7, the sprocket, loose on the axle at one end of the hub; 8, a boss projecting inwardly from the sprocket and loosely into a counterbore formed in the contiguous end of the hub; 9, ratchet-teeth on the periphery of this boss, these teeth facing in the direction of forward rotation, that is to say, facing forward as the sprocket turns forward, as indicated by the arrows in Figs. 1 and 2; 10, pawls carried by the hub and coöperating with teeth 9, the illustration showing the hub as being provided with three of these pawls, teeth 9 and pawls 10 typifying a well known form of mechanical movement, for which there are many well known equivalents, for causing one rotating member of a couple to enforce rotation upon the other rotating member of the couple in one direction only; 11, a longitudinally split brake-sleeve having its periphery engaging bore 6 of the hub, normally with looseness or with such degree of looseness as will permit the hub to rotate freely upon the brake-sleeve, this brake-sleeve extending substantially the entire length of the bore of the hub; 12, a tongue and groove arrangement at one end of the brake-sleeve, coöperating between the brake-sleeve and the axle to prevent the rotation of the brake sleeve, the illustration showing this tongue and groove arrangement as being formed by grooves in the end of the brake sleeve and coöperating tongues carried by a ball-bearing member fast on the axle, this tongue and groove arrangement merely typifying means for securing the brake-sleeve against rotation; 13, an elliptic bore in the split brake sleeve; 14, an elliptic cam mounted for rotation on the axle and disposed within the elliptic bore of the brake sleeve and extending throughout the major portion of the length of that bore, one end of this cam having a circular portion projecting into a counterbore in the inner face of boss 8; 15, ratchet-teeth formed on the cylindrical end of cam 14, these teeth facing in the same direction as ratchet-teeth 9 on the boss of the sprocket; and 16, pawls carried by boss 8 of the sprocket and coöperating with the ratchet teeth 15 of the cam, the illustration showing three of these pawls, the pawls and teeth typifying means by which the boss may enforce the rotation of the cam in one direction only.

When the sprocket turns in the direction of the arrows, as caused by the usual forward pedaling, the teeth 9 on boss 8 engage one or more of pawls 10 and enforce the forward turning of the wheel, thus propelling the bicycle in the forward direction. In this operation of the parts pawls 16 click idly over teeth 15 on the stationary cam. If, while the bicycle is moving forward, the motion of the sprocket be arrested, by the cessation of pedaling, then the hub and its wheel continues to run in the forward direction, pawls 10 clicking idly over teeth 9, the bicycle then coasting. In this operation the sprocket and cam are stationary.

If, while the bicycle is coasting, or even while it is being propelled forward by the pedals, the sprocket be turned slightly in a direction the reverse of the arrows, by back pedaling, then one or more of pawls 16 will engage teeth of the cam and partially rotate the cam on the axle. This results in the expansion of the split brake sleeve, causing it to frictionally engage the bore of the hub and, as the brake sleeve cannot rotate, to bring into action the brake formed by the periphery of the brake sleeve. In this connection attention is called to the simplicity of the structure, to the avoidance of parts moving endwise of the axis of the hub, either in propelling the wheel forward or in applying the brake, and to the extended wearing surfaces formed by the periphery of the long brake sleeve and long cam.

I claim:—

1. A coaster brake comprising, an axle, a hub carried thereby and provided with a cylindrical bore concentric with the axle and extending the major portion of the length of the hub, a split brake-sleeve having its periphery in engagement with said bore and extending substantially the whole length thereof and provided with a cam-bore extending substantially throughout its length, means for preventing the rotation of the brake-sleeve, a cam mounted for rotation upon the axle and adapted to engage the cam-bore in the brake-sleeve, a sprocket loose on the axle at one end of the hub, means connecting the sprocket with the hub and adapted to cause the turning of the sprocket in the forward direction to enforce the turning of the hub in the same direction while permitting the hub to turn forward freely in relation to the sprocket, and means connecting the sprocket with the cam to cause the sprocket to turn the cam when the sprocket is turned in backward direction and to permit the sprocket to turn freely relative to the cam when the sprocket turns in the forward direction, combined substantially as set forth.

2. A coaster brake comprising, rear fork-members, an axle fixedly carried thereby, ball-bearings carried by the axle, a hub surrounding the axle and supported by the ball-bearings and having a cylindrical brake-bore extending through it and having a counterbore at one end of the brake-bore, a sprocket loose on the axle at the counterbored end of the hub, a boss projecting from the sprocket into said counterbore, ratchet-teeth formed on the periphery of the boss, pawls carried by the hub and adapted to be engaged by said ratchet-teeth to propel the hub in the forward direction when the sprocket turns in the forward direction, a split brake-sleeve fitting the bore of the hub and having an elliptic bore, means for preventing the turning of the brake-sleeve relative to the axle, a cam mounted for rotation on the axle and extending substantially the full length of said brake sleeve and having a periphery adapted to coöperate with the elliptic bore of the brake sleeve, ratchet-teeth carried by the end of the cam nearest the sprocket and facing in the same direction as the first-mentioned ratchet-teeth, and pawls carried by the boss and adapted to engage the ratchet-teeth of the cam and turn the cam in backward direction and expand the brake-sleeve when the sprocket is turned in backward direction, combined substantially as set forth.

OWEN C. WATKINS.

Witnesses:
ALLEN S. FINZEL,
J. L. WAITE.